United States Patent Office 3,418,277
Patented Dec. 24, 1968

3,418,277
TWO-STAGE PROCESS FOR MAKING SULFONE POLYMERS
Saul M. Cohen, Springfield, and Raymond H. Young, Jr., East Longmeadow, Mass., assignors to Monsanto Company, St. Louis, Mo., a corporation of Delaware
No Drawing. Filed Oct. 18, 1966, Ser. No. 587,438
7 Claims. (Cl. 260—49)

ABSTRACT OF THE DISCLOSURE

Disclosed herein is a method for further polymerizing low molecular weight oligomers prepared from a disulphonic acid monomer having the following recurring unit in the oligomer:

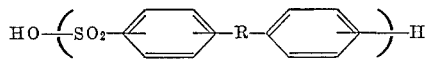

which process comprises (1) devolatilizing the oligomers and (2) further polymerizing the oligomers to a high molecular weight polymer having a viscosity of at least 0.2 dl./g. (measured in dimethyl acetamide solution at 20° C.) in the presence of a catalyst-medium selected from the group consisting of polyphosphoric acid and carboxylic acid anhydrides.

---

This application relates to a novel process for the production of polymeric materials. More particularly, it relates to a novel process for the production of aromatic sulfone polymers which have a high degree of thermal stability.

The various available aromatic sulfone type polymers described in patent literature such as U.S. Patent 2,781,402 and British Patent 927,822 are prepared using a Freidel-Crafts type process. Experience has taught that this type of process for the production of aromatic sulfone polymers has certain drawbacks which limit the use of this method for the production of these polymers. Examples of these drawbacks are the solvent limitations which frequently are required using the Freidel-Crafts type process. It is well known to those skilled in the art that the Freidel-Crafts type reaction usually is limited to three specific solvents, e.g., nitrobenzene, carbon disulfide and ethylene chloride. The latter two solvents, when used in the production of aromatic sulfone polymers usually result in low molecular weight polymers which have limited use. Another drawback is that the Freidel-Crafts type catalysts must be freshly prepared or else they have limited catalytic activity. Furthermore, these catalysts require anhydrous conditions at all times prior to and during a reaction to be effective.

Past attempts to prepare aromatic sulfone polymers using methods other than the Freidel-Crafts processes have failed to produce aromatic sulfone type polymers of significant molecular weight. The low molecular weight polymers (oligomers) produced by these previous methods have little or no utility as, e.g., surface coatings, etc.

It is generally considered, that in order to have utility as surface coatings, insulation, etc., the aromatic sulfone polymers of the type described in this invention should have a molecular weight which is substantially higher than the low molecular weight of the oligomers described above. To have utility in the surface coating and related fields, aromatic sulfone polymers should have a molecular weight which corresponds to an inherent viscosity of at least 0.2 dl./g. in dimethylacetamide at 20° C.

A definite need exists for a process by which aromatic sulfone polymers can be made readily without using the sensitive Freidel-Crafts type catalysts and which will give aromatic sulfone polymers with a substantial molecular weight.

Therefore, it is an object of this invention to provide a novel process for the preparation of aromatic sulfone polymers.

It is another object of this invention to provide aromatic sulfone polymers which are produced by this novel process.

These and other objects are obtained by a process for the copolymerization of monomers of the general structural formulae:

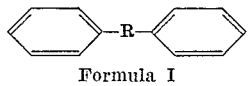

Formula I and

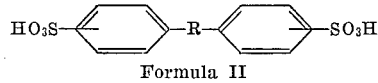

Formula II to form a polymer characterized by the following repeating unit

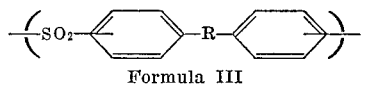

Formula III wherein R is a divalent radical independently selected from the group consisting of oxygen, sulfur, and —Si($R_1$)$_2$—wherein $R_1$ is alkyl or aryl; and wherein the polymer has an intrinsic viscosity of at least 0.2 dl./g. when measured in dimethylacetamide at 20° C.; which process comprises:

(a) reacting the monomers in an inert aromatic hydrocarbon medium at temperatures of at least 125° C. to form an intermediate low molecular weight polymer, wherein the water evolved during polymerization is being removed as it forms (b) recovering and heating the intermediate low molecular weight polymer formed to remove all volatiles (c) further polymerizing the intermeditae low molecular weight polymer formed in the presence of a catalyst-medium selected from the group consisting of polyphosphoric acid and carboxylic acid anhydrides.

The following examples are given in illustration of this invention and should not be construed as limitations thereof. All parts and percentages are by weight unless otherwise indicated. The intrinsic viscosities referred to are measured at 20° C. in dimethylacetamide solutions containing 0.282M pyridinium hydrogen sulfate.

EXAMPLE I

This example illustrates the preparation of poly[(4-oxy-p-phenylene) (p-phenylene)sulfone] using a polyphosphoric acid catalyst. This preparation may be illustrated by the following general equations:

Part A

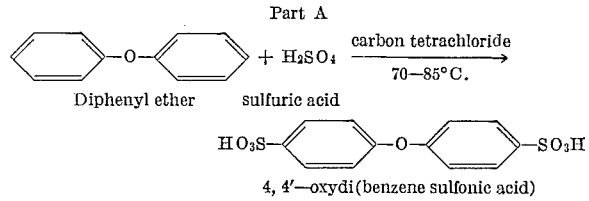

Part B

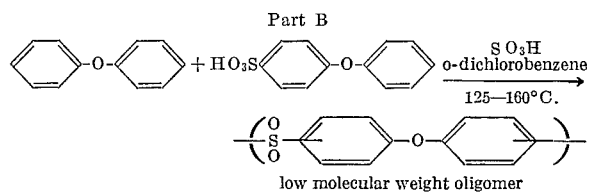

Part C

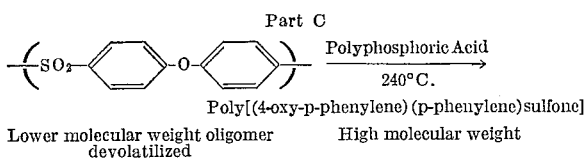

Lower molecular weight oligomer
devolatilized

Poly[(4-oxy-p-phenylene)(p-phenylene)sulfone]
High molecular weight

Part A.—Synthesis of 4,4'-oxydi(benzene sulfonic acid)

The following ingredients are charged to a 1-liter, 3-necked, round-bottomed flask equipped with a Teflon stirrer, a reflux condenser with attached calcium chloride drying tube at the top, dropping funnel and a lighter-than-water type continuous extraction with a drain stop cock at the bottom:

| | |
|---|---|
| Sulfuric acid (96.6%) grams | 60.8 |
| Diphenyl ether do | 51.0 |
| Carbon tetrachloride ml | 350 |

Half of the extraction column up to the side arm is filled with concentrated sulfuric acid and the remainder is filled with carbon tetrachloride. The reaction mixture is stirred at reflux (82° C.) for 21 hours. Only a small amount of water from the reaction is observed in the extraction column at this stage. The 4,4'-oxdi(benzene sulfonic acid product), which is not isolated, is an orange oil of very low viscosity.

Part B.—Preparation of low molecular weight polymer

This stage of the polymerization is carried on in the same reaction flask described in Part A using the orange oil formed therein as a monomeric reactant, without removing the reactants or products of Part A from the flask. However, the extraction column is drained through the lower stop cock and carbon tetrachloride is distilled off with stirring. Periodically, a volume of orthodichlorobenzene equal to that of the removed carbon tetrachloride is added to maintain a constant reaction volume in the flask and the temperature of the reaction mixture thus is raised gradually to 125° C. When the temperature of the reaction vessel reaches 125° C., 51.0 grams diphenyl ether in more ortho-dichlorobenzene is added to the reaction mixture and the heat is increased to obtain a final reflux temperature of 146° C.

The extraction column is now recharged with sulfuric acid and a 1:1 mixture of carbon tetrachloride and ortho-dichlorobenzene. The reaction mixture is stirred at reflux (146°) for 18 hours. Water of reaction appears very early during this stage even as the temperature is being raised from 125° to 146° C. Thereafter, it is produced steadily over at least the next six hours. The low molecular weight polymer product produced at this stage is a dark brown viscous solid having an inherent viscosity $[\eta]$ of 0.1 dl./g. in dimethylacetamide at 20° C. which corresponds to a molecular weight of about 1,000 and a degree of polymerization about 5. The stirred polymeric product then is heated gradually to 240° C. over phosphorous pentoxide ($P_2O_5$) under vacuum conditions to remove substantially all traces of volatiles. The cooled polymer is then ground to a fine powder.

Part C.—Preparation of high molecular weight poly[(4-oxy-p-phenylene)(p-phenylene)sulfone] using a polyphosphoric acid catalyst The following ingredients are charged to a 500-ml., 3-necked round-bottomed flask equipped with a Teflon bladed stirrer, reflux condenser with calcium chloride drying tube and dropping funnel;

Lower molecular weight sulfone resin from

| | |
|---|---|
| Part B above grams | 30.0 |
| Diphenyl sulfone do | 10.0 |
| Polyphosphoric acid: | |
| Phosphoric acid (85%) do | 88.6 |
| Phosphorous pentoxide do | 111.4 |
| Ortho-dichlorobenzene ml | 4 |

In this reaction step diphenyl sulfone is added as an inert plasticizer to keep the polymeric mass in a semifluid state while the ortho-dichlorobenzene serves to wash any sublimed materials from the walls of the apparatus.

The foregoing mixture is heated to 240° C. for 6 hours, after which time the reaction mixture is cooled to room temperature. The resultant black solidified mass is dissolved in 250 ml. of pyridine and refluxed for one hour. 75 ml. of water is then added to hydrolyze any remaining polyphosphoric acid and reflux is continued for another 3½ hours. At this time 400 ml. of water is further added dropwise, with stirring, following by 250 ml. of benzene. The mixture is cooled to about 0° C. and the amorphous solid polymer is recovered by filtration, washed with water and returned to the flask.

The amorphous solid is dissolved in 500 ml. of pyridine under reflux conditions and filtered hot through a Buchner funnel lined with felt. 300 ml. of pyridine is removed by distillation whereupon 500 ml. of water is added dropwise with stirring to the refluxing pyridine solution, followed by 250 ml. of benzene.

The resulting emulsion is cooled to about 0° C. and treated with 125 ml. of glacial acetic acid which is added dropwise to the stirred solution in order to harden the polymer droplets. The polymer particles are recovered by filtration and reprecipitated again according to the foregoing procedure. The recovered resin is dried at 110° C. and 50 mm. vacuum for 18 hours. The resulting high molecular weight polymer is found to have an intrinsic viscosity $[\eta]$ equal to 0.47 in dimethyl acetamide at 20° C. which corresponds to a molecular weight of about 17,000.

The phosphorous content of the polymer is only 0.04% which indicates that there is little or no combined phosphorous. Proof of the polymer structure is evidenced by an infrared absorption curve and by elemental analysis.

In regard to Example I, Part B, it should be noted that only oligomers resulted during this stage of polymerization. It was generally believed that the inherent nature of the system described herein precluded the formation of higher molecular weight polymers. Surprisingly enough, it was found that by devolatilizing the system prior to further polymerization with a special catalyst-anhydride system a sulfone polymer with a substantial molecular weight could be achieved. The critical feature of this devolatilization step is illustrated below.

EXAMPLE 2

This example is set forth to further illustrate the critical feature of removing substantially all the volatiles from the oligomer formed in Example 1, Part B prior to the final polymerization step.

Example 1 is repeated here except that the oligomer used in Part C is not completely devolatilized. This oligomer has a volatile content which is primarily about 10 mole percent water with very slight amounts of carbon tetrachloride and/or o dichlorobenzene.

The procedure of Example 1, Part C is followed here to give a produce having an inherent viscosity of less than 0.2 dl./g. in dimethylacetamide at 20° C. and a molecular weight which is only slightly higher than that of the oligomer that was used as a reactant.

EXAMPLE 3

This example is set forth to illustrate the preparation of higher molecular weight poly[(4-oxy-p-phenylene)(p-phenylene)sulfone] using benzoic anhydride as the polymerization catalyst in the final polymerization step in place of the polyphosphoric acid used in Example 1.

In this example a low molecular weight polymer is prepared according to the procedure set forth in Example 1, Parts A and B. For Part C of the present example, a 1-liter, 3-necked round-bottomed flask equipped with a Teflon bladed stirrer, a dropping funnel and fractionating still head with an attached calcium chloride drying tube is used. The following ingredients are charged into this flask.

Fluoro anionic surfactant _____grams__ 0.037
Sulfone resin oligomer prepared as in Example 1,
Part B above _____do____ 20.0
Benzoic anhydride _____do____ 100.0

The foregoing materials are heated with stirring at 100° C. for 1.75 hours at which time 65 ml. of acetic anhydride are added. The reaction temperature is then raised to 175° C. for 1.75 hours during which time any acetic acid that forms is distilled from the reaction flask under increasing vacuum. After the distillation has ceased, the dark red polymer solution is stirred at 160° C. for another 1.5 hours.

The resulting polymer solution is stirred at 180° C. for one hour and at 200° C. for one hour, and then the temperature is raised to about 240° C. over a period of 6 hours.

The mixture is then cooled to 78° C. and 250 ml. of dry benzene is added while maintaining reflux for one hour. The mixture is cooled to about 0° C. and the polymer recovered by filtration. The polymer is purified by repeating precipitation according to the procedure set forth in Example 1, Part C above. The resulting polymer is dried at 110° C. under 50 mm. of vacuum for 18 hours. The resulting high molecular weight polymer has an intrinsic viscosity $[\eta]$ of about 0.47 dl./g. in dimethylacetamide at 20° C.

EXAMPLE 4

Example 1 is repeated here except that the following materials are used as reactants.

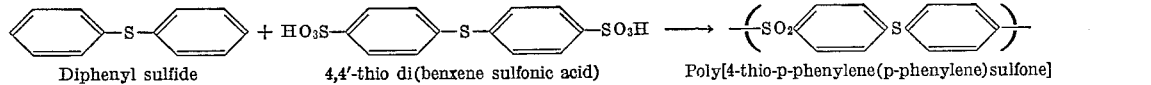

Diphenyl sulfide    4,4'-thio di(benzene sulfonic acid)    Poly[4-thio-p-phenylene(p-phenylene)sulfone]

The general procedure of Example 1 is used to form a polymer which has a molecular weight which corresponds to that polymer prepared in Example 1.

EXAMPLE 5

The general procedure of Example 1 is repeated using the following materials as reactants:

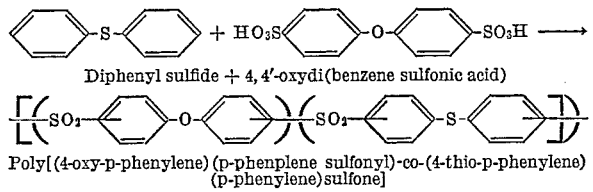

Diphenyl sulfide + 4,4'-oxydi(benzene sulfonic acid)

Poly[(4-oxy-p-phenylene)(p-phenlene sulfonyl)-co-(4-thio-p-phenylene)(p-phenylene)sulfone]

The polymeric product is characterized by an inherent viscosity comparable to that obtained for the final polymer in Example 1, Part C.

EXAMPLE 6

This example illustrates monomeric reactants which are not suitable in the process set forth in this invention. The following monomers are found to give a gel in the early stages of the oligomer polymerization step.

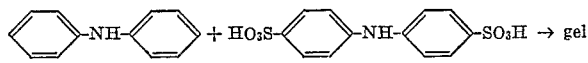

The general procedure of Example 1 is followed except that the cross-linked gel is formed in the earlier stages of the reaction and cannot be converted into a higher molecular weight polymer.

EXAMPLE 7

Example 1 is repeated here except that dimethyl diphenyl silane is substituted for the diphenyl ether used in Example 1. Comparable results are obtained.

The process of this invention comprises first reacting at least one monomer of the class represented by Formula I above with at least one monomer of the class represented by Formula II above in an inert organic medium at temperatures of at least 125° C. to form an oligomer which is devolatilized and then polymerized further in the presence of a catalyst-anhydride medium to form a sulfone polymer with an inherent viscosity of at least 0.2 dl./g. in dimethylacetamide at 20° C.

The di(phenyl sulfonic acid) monomers represented by Formula II above may be prepared according to the method of Example 1, Part A or according to the techniques set forth in the literature, e.g., Hoffmeister, Ann., vol. 159, p. 191 (1871).

It should be noted that the R group in the monomer reactants as illustrated by Formulae I and II may be the same in each reactant as in Examples 1, 3 and 4 or they may be different as in Example 5. The preferred $R_1$ groups in the $-Si(R_1)_2-$ structure are alkyls of from 1 to 4 carbon atoms and aryls of from 6 to 8 carbon atoms. Especially preferred are alkyls of from 1 to 2 carbon atoms and a 6 carbon aryl radical.

The reaction of two types of monomers, i.e., those represented by Formula I and Formula II above to form an oligomer is carried out an inert liquid organic medium with a high boiling point wherein any water evolved during the polymerization process is removed as quickly as it is formed. This reaction is carried out using temperatures in the range of from about 125 to 160° C. Preferably, one would use temperatures in the range of from 140 to 160° C.

The medium used in the oligomer polymerization step should be an inert aromatic hydrocarbon liquid capable of azeotropic distillation with water. Preferably, the liquid would have a boiling point of above 150° C. Examples of such hydrocarbons include benzene derivatives containing two or more halogen substituents or at least one nitro substituent. Examples of these include ortho and meta dichlorobenzene and dibromobenzene, fluorochlorobenzenes, nitrobenzene, etc.

After the oligomer formation reaction is complete, the oligomer is then treated to remove substantially all volatiles. Preferably, the volatiles are removed by heating the stirred oligomer under vacuum conditions. More preferably, the volatiles are removed using heat and vacuum conditions and a drying agent such as phosphorous pentoxide. The devolatilized oligomer is then polymerized further in the presence of a catalyst-anhydride medium selected from the group consisting of polyphosphoric acid and carboxylic acid anhydrides.

These catalyst-anhydride media serves to catalyze the polymerization reaction and favor the formation of high molecular weight polymers while at the same time reacting with any water evolved during polymerization. This latter feature of taking up water is essential in that it is believed that the water formed is detrimental to the further polymerization of the oligomers, if left free in the polymerization system.

The amount of catalyst-medium used in the final polymerization step should be such that more than one mole of catalyst is present for each mole of sulfonic acid groups in the starting oligomer.

The polyphosphoric acid catalyst is prepared by mixing phosphoric acid (85%) and phosphorus pentoxide as is well known to those skilled in the art. Prferably, the polyphosphoric acid catalyst used would contain from 70 to 86% phosphorus pentoxide in the catalyst system based on the total weight of the system. A suitable carboxylic acid anhydride catalyst may be represented by the general generic formula:

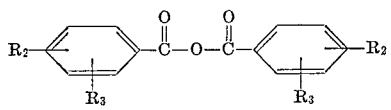

wherein $R_2$ and $R_3$ are independently selected from the group consisting of hydrogen, halogen and nitro. Examples of these carboxylic acid anhydride catalysts would include benzoic anhydride, and substituted benzoic anhydrides prepared from mono and dihalo benzoic acids, and mono nitro benzoic acids.

The scope of this invention contemplates the preparation of sulfone polymers having an intrinsic viscosity $[\eta]$ of at least about 0.2 dl./g. when measured in dimethyl acetamide at 20° C. This value represents a significant advance of the state of the art prior to the present invention. As pointed out above the oligomer formed by the process set forth in Example 1, Part B have an intrinsic viscosity of about 0.1 dl./g. in dimethylacetamide at 20° C. These oligomers lack utility as surface coating, insulation, etc. Further attempts to prepare high molecular weight polymers by the techniques used to prepare the oligomers were unsuccessful.

The intrinsic viscosity of the polymers may be controlled by regulating the polymerization time/temperature cycle for the final polymerization steps using the catalyst-anhydride medium. This time factor is illustrated in the following example.

EXAMPLE 8

Example 1 is repeated in its entirety here except that the further polymerization of the devolatilized oligomer in Part C is carried out for 2.5 hours in contrast to the 6 hour polymerization time used in Example 1, Part C. The resulting polymer is comparable to that prepared in Example 1, except that the polymer in this example has an intrinsic viscosity of about 0.2 dl./g. in dimethyl acetamide at 20° C.

The utility of the high molecular weight sulfone polymers that are prepared in accordance with the practice of this invention are illustrated in the following Example 9.

EXAMPLE 9

Aluminum panels are coated with phenol solutions (~10% by weight) of the oligomer prepared in Example 1, Part B and the polymers prepared in Example 1, Part C and Example 8, respectively. The coatings are cured according to the following schedule:

| | Hours |
|---|---|
| 180° C. | 1.5 |
| 250° C. | 0.5 |
| 300° C. | 3.0 |

The coatings are then examined visually for appearance and tested manually for toughness and flexibility. The results are tabulated below.

TEST RESULTS

| Sample | Intrinsic Viscosity [1] | Appearance | Toughness [2] |
|---|---|---|---|
| Oligomer | 0.1 | Checked | Cracks. |
| Ex. 1, Part C | 0.47 | Smooth, glossy | Flexible. |
| Ex. 8 | 0.2 | do | Do. |

[1] Measured in demethyl acetamide at 20° C.
[2] Toughness tested by flexing panel through 180°.

The panel coated with brittle oligomer could not be flexed even slightly without cracking the polymer coating whereas the polymers with the higher instrinsic viscosity were tough and flexible and could be flexed up to 180°.

The polymers of this invention find special use in the surface coatings and electrical insulation field where resistance to high temperature and to oxidative degradation is essential. The polymers of this invention also exhibit high temperature stability, i.e., 200 to 300° C. in a variety of corrosive environments.

It should be apparent to those skilled in the art that many variations may be made in the products and processes described in this invention without departing from the scope thereof.

What is claimed:
1. In the process for the copolymerization of monomers of the following general structural formula:

(A) 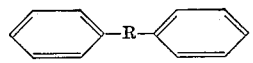

and (B) 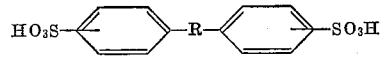

to form a low molecular weight polymer characterized by the following repeating unit:

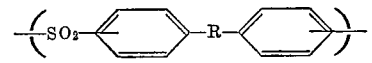

wherein R is a divalent radical independently selected from the group consisting of oxygen, sulfur, and

and wherein $R_1$ is selected from the group consisting of alkyl or aryl; which process comprises reacting the monomers in an inert aromatic hydrocarbon medium at temperatures of at least 125° C. to form a low molecular weight polymer wherein the water evolved during polymerization is being removed as it forms; the improvement which consists of:
(1) recovering and heating the low molecular weight polymer formed to remove substantially all volatiles, and
(2) further polymerizing the low molecular weight polymer to a polymer having an intrinsic viscosity of at least 0.2 dl./g. when measured in dimethyl acetamide solution at 20° C.; wherein the further polymerization step is carried out in the presence of a catalyst-medium selected from the group consisting of polyphosphoric acid and carboxylic acid anhydrides.

2. The process of claim 1 wherein the catalyst-medium is a polyphosphoric acid containing of from 70 to 86% phosphorous pentoxide in the catalyst system.

3. The process of claim 1 wherein the catalyst-medium is

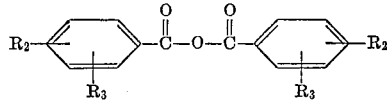

wherein $R_2$ and $R_3$ are independently selected from the group consisting of hydrogen, halogen and nitro.

4. The process of claim 3 wherein $R_2$ and $R_3$ are hydrogen.

5. The process of claim 1 wherein the monomers are diphenyl ether and 4,4'-oxydi(benzene sulfonic acid).

6. The process of claim 1 wherein the initial polymerization of the intermediate polymer is carried out in an ortho-dichlorobenzene/carbon tetrachloride solution and wherein the water evolved during polymerization is removed by azeotropic distillation.

7. The process of claim 1 wherein the monomers are diphenyl ether and 4,4'-thiodi(benzene sulfonic acid).

References Cited

UNITED STATES PATENTS 3,262,914  7/1966  Goldberg et al. _____ 260—49
3,264,536  8/1966  Robinson et al. _____ 317—258

FOREIGN PATENTS 1,383,048  11/1964  France.

OTHER REFERENCES

Olah: Friedel-Crafts and Related Reactions, vol. I, New York, Interscience (1963), pp. 203 and 328).
Michael et al.: Berichte, 10 (1877), pp. 583–587.

WILLIAM H. SHORT, *Primary Examiner.*

M. GOLDSTEIN, *Assistant Examiner.*

U.S. Cl. X.R.

117—127; 260—30.2, 33.4, 79.3